J. F. STEWARD.
Grain-Binder.

No. 210,723. Patented Dec. 10, 1878.

Witnesses:
P. C. Dieterich
Frank H. Duffy

Inventor:
John F. Steward
Per West & Bond, Attorneys.

N. PETERS, PHOTO-LITHOGRAPHER, WASHINGTON, D. C.

UNITED STATES PATENT OFFICE.

JOHN F. STEWARD, OF PLANO, ILLINOIS.

IMPROVEMENT IN GRAIN-BINDERS.

Specification forming part of Letters Patent No. 210,723, dated December 10, 1878; application filed August 14, 1877.

*To all whom it may concern:*

Be it known that I, JOHN F. STEWARD, of Plano, in the county of Kendall and State of Illinois, have invented certain new and useful Improvements in Grain-Binders; and I do hereby declare that the following is a full, clear, and exact description thereof, which will enable others skilled in the art to which it appertains to make and use the same, reference being had to the accompanying drawings, and to the letters of reference marked thereon, which form a part of this specification.

This invention relates to automatic grain-binders; and it consists in the combination of suitable gears and spindle or arbor with a spool provided with ledges, and held on the spindle by friction, and rotated in an opposite direction to that which it turns in paying out the wire, as will be hereinafter more fully set forth.

Figure 1:
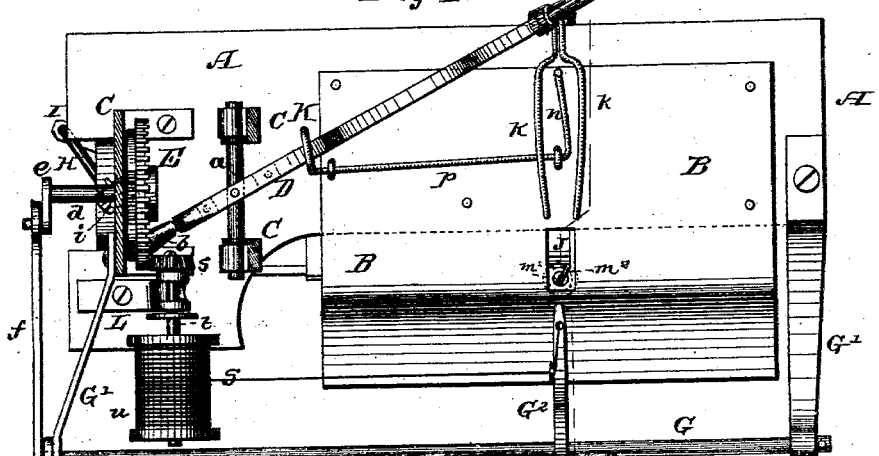
Figure 2:
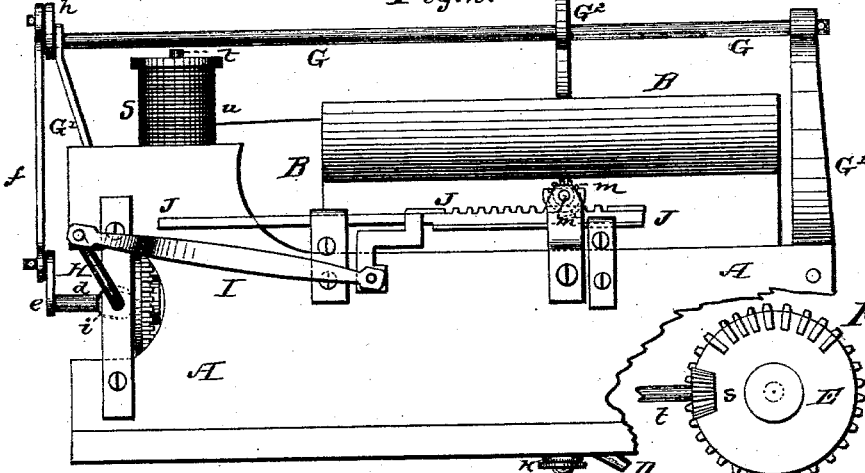
Figure 5:
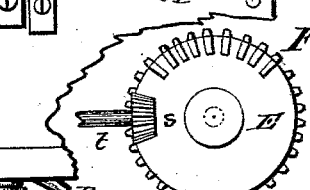
Figure 3:
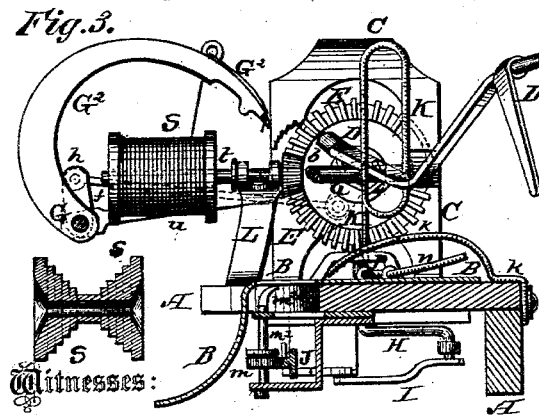

In the annexed drawing, which fully illustrates the invention, Figure 1 is a plan view of a grain-binder embodying the invention. Fig. 2 is a plan view of the bottom of the machine, and Figs. 3 and 4 transverse vertical sections of the same. Fig. 5 is a detail view of a part thereof.

A represents the platform, upon which the binding mechanism is mounted, and provided with a metal plate, B, forming a portion of the receiving-platform.

C is a metal standard or frame, located at the rear end of the platform A, to which it is rigidly secured. The upper portion of this frame is curved, and bent over and downward, so as to form a guard to protect the operating devices located on the frame, and also to form a support for the rake D. This rake is pivoted to a rock-shaft, $a$, which has its bearings in suitable boxes in the lower end of the curved portion of the frame C.

The inner end of the rake-arm is inserted in a socket, $b$, formed on or attached to a gear-wheel, E, whereby the necessary motion is imparted to the rake from said wheel. The gear-wheel E is mounted on a shaft, $d$, journaled in the frame C, and on the end of said shaft is a crank, $e$, connected by a pitman, $f$, with a crank, $h$, and the end of a shaft, G, in such a manner that by the revolution of the shaft $d$ the said shaft G will obtain a rocking motion.

The shaft G is journaled in arms $G^1$ $G^1$, attached to and projecting from the platform and frame, and carries the needle-arm $G^2$, as shown.

The gear-wheel E has on one side a cogged segment, which meshes with a pinion, $i$, on a crank-shaft, H, to give said shaft an intermittent rotary motion; and this crank-shaft is, by a pitman, I, connected with a rack-bar, J, moving back and forth in suitable guides under the platform A. The rack-bar J gears with a pinion, $m$, on a shaft, $m^1$, which carries the twister $m^2$ at its upper end, and thus the necessary movement is imparted to the twister.

On top of the platform A, between two wire guides, $k$ $k$, works a tooth, $n$, projecting from a rocking shaft, $p$, which has a slotted arm, K, at its other end, and the rake D passes through said slotted arm, so that by the movement of the rake the tooth or arm $n$ will be raised and lowered at proper intervals.

The gear-wheel E above mentioned meshes with a pinion, $s$, upon a spindle or arbor, $t$, having its bearings in a standard, L, or in arms projecting from the frame C. Upon this arbor or spindle the spool S is placed and held by friction in any suitable manner. The spool is made with the ends sloping inward and provided with ledges. Their purpose is to prevent the wire from being drawn down into any space that may occur between the body of the wire wound upon the spool and the head of the same. It has been found that a serious difficulty is encountered when the wire is being drawn from the spool in the operation of binding grain, the wire cutting in at the ends, so as to produce undue tension, sufficient to break the wire. With the spool provided with the ledges shown the wire can cut in only as far as the first ledge.

The wire $w$ from the spool passes through the needle-arm in the usual manner, and when the wire is pulled it will rotate the spool in the opposite direction to the revolution of the spindle. The force exerted by the needle-arm in its descent when it pulls the wire overcomes the friction of the spool on the spindle and the spool is turned to unwind the wire; but if the wire becomes slack, the spool is rotated in an opposite direction, taking up such slack.

Figure 4:
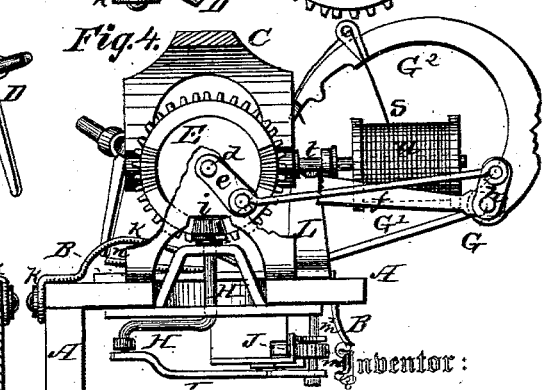

It is evident that any suitable friction device may be employed to hold the spool on the spindle or arbor. It is also evident that it is not necessary that the spool should rotate constantly to take up the slack in the wire, as an intermittent motion may be sufficient, which may be accomplished by mutilating the gear-wheel E, by leaving off part of the cogs, as shown in Figs. 4 and 5 of the drawings.

Having thus fully described the invention, what is claimed as new, and desired to be secured by Letters Patent, is—

In a grain-binder, the combination of the gears E $s$, the spindle or arbor $t$, and the spool S, provided with ledges and held on said spindle by friction, and arranged to be rotated thereby in the opposite direction to that in which it is turned for paying out the wire, for the purpose herein set forth.

In testimony that I claim the foregoing as my own I have hereto affixed my signature in presence of two witnesses.

JOHN F. STEWARD.

Witnesses:
   FRANK GALT,
   C. H. WATSON.